Inventor
WILLIAM M. WHEILDON, JR.

United States Patent Office 2,695,628
Patented Nov. 30, 1954

2,695,628

CHECK VALVE

William M. Wheildon, Jr., Framingham, Mass., assignor to Norton Company, Worcester, Mass., a corporation of Massachusetts Application October 19, 1950, Serial No. 190,923

5 Claims. (Cl. 137—533.11)

The invention relates to check valves.

One object of the invention is to provide a check valve which is highly resistant to corrosion. Another object of the invention is to provide a check valve which is highly resistant to abrasion. Another object of the invention is to provide a superior check valve for use in oil well pumps. Another object of the invention is to provide a ball and seat check valve of rugged characteristics.

Another object of the invention is to provide a check valve with a light weight ball to minimize impacts on the seat. Another object of the invention is to provide a check valve which can stand very high temperatures. Another object of the invention is to provide a ball for check valves which is extremely resistant to abrasion, to corrosion, to heat and is light in weight to minimize impacts against the seat.

Other objects will be in part obvious or in part pointed out hereinafter.

Figure 1:
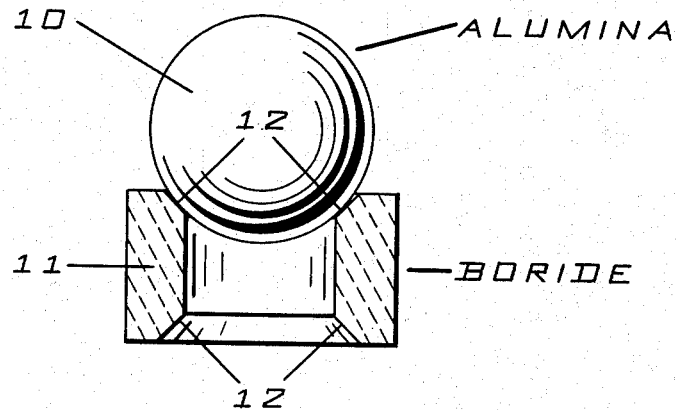
Figure 2:
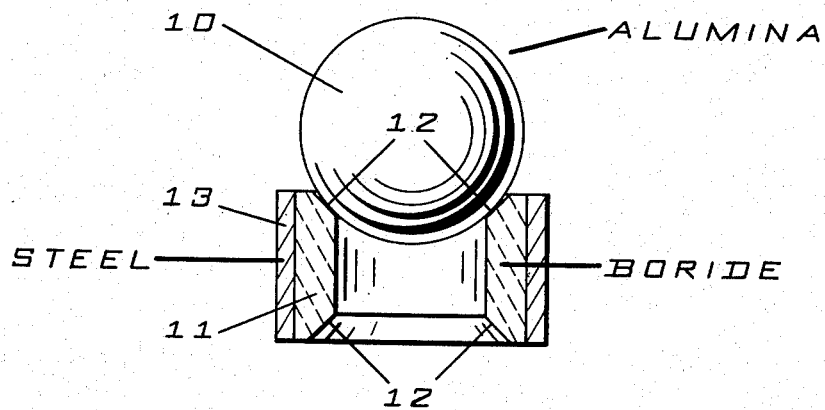

In the accompanying drawings illustrating two of many possible embodiments of the mechanical features of this invention, Fig. 1 is a sectional view of the seat of a check valve and an elevation of the ball thereof, Fig. 2 is likewise a sectional view of the seat of a check valve and an elevation of the ball thereof in another embodiment of the invention.

Referring now to Figure 1, I provide a ball 10 and a seat 11. The ball 10 is made of alumina. The seat 11 is made of carbon boride either pure or in admixture with metal boride selected from the group consisting of $TiB_2$, $VB_2$, $CrB_2$, $ZrB_2$, $CbB_2$, $Mo_2B_5$, $HfB_2$, $TaB_2$ and $W_2B_5$ and mixtures thereof. There may be from nothing to 50% by volume of metal boride in this composition. However, impurities cannot be excluded and so I can state the composition as being 90% by volume of boride selected from the group consisting of $CB_4$, $TiB_2$, $VB_2$, $CrB_2$, $ZrB_2$, $CbB_2$, $Mo_2B_5$, $HfB_2$, $TaB_2$ and $W_2B_5$, and mixtures thereof, at least 40% by volume of the composition being carbon boride $CB_4$ and not over 50% of the composition by volume being metal boride, and 97% by volume of the composition being boride selected from said group and uncombined boron and carbon in solid solution. In the above statement carbon is not considered to be a metal but all the other borides are considered to be metal borides. These compositions and methods of making them are disclosed in a copending application of my colleague Harold R. Montgomery, Serial No. 162,800 filed May 18, 1950, now U. S. Patent No. 2,613,154 granted October 7, 1952.

For the manufacture of the balls I may use a mixture as follows:

Table I

| | |
|---|---|
| High purity crystalline alumina particles of 900 grit size with low soda content. | 98.7% by weight. |
| Cobalt oxide powder | .9% by weight. |
| Magnesium carbonate powder. | .4% calculated as MgO. |

This material is thoroughly mixed and then placed in a graphite mold. It is economical to make a number of balls in the same operation so therefore a cylindrical piece of graphite may have three bores therein with a pair of graphite mold plungers for each bore and a central graphite mold stop for each bore thus to make six balls at once. The internal faces of the mold plungers and of the central mold stop are hemispherical. Each mold cavity is filled with the mixture of Table I and then placed in a pressure molding furnace such as illustrated and described in U. S. Patent No. 2,125,588 and the material is pressed preferably at 2500 pounds per square inch while heated to 1750° C. top temperature. Mold equipment such as may be used in manufacturing these balls is further disclosed in U. S. Patent No. 2,150,884.

To eliminate dimensional inaccuracies, surface imperfections and the equatorial ridge which is usually formed, the balls are then ground on a ball grinder with silicon carbide ball grinding wheels. This operation brings the balls to within very close tolerances as to diameter and roundness. Preferably in order to produce a smooth polished surface the balls are then lapped. They can be lapped by hand with diamond dust and when thus finished each ball has a reflective surface.

For the manufacture of the seats I provide carbon boride $CB_4$ or a mixed boride as above defined, place a quantity thereof in mold cavities in graphite molds such as of the type disclosed in the aforesaid Patent No. 2,150,884, place the mold in the furnace of the aforesaid Patent No. 2,125,588 and press at preferably 2500 pounds per square inch while heating the material in a furnace of Patent No. 2,125,588 to a temperature of around 2250° C., the exact moment to stop raising the temperature being determinable by movement of the pressure plungers as the material is compacted.

The rough pieces produced in the furnace are ground with diamond grinding wheels to produce the seat surfaces 12 which are then lapped with a steel ball and diamond powder, the steel ball being of the same size as the ball 10. The outer cylindrical surfaces of the seats 11 are also preferably ground.

The ball 10 of Figure 2 is the same as the ball 10 of Figure 1, the seat 11 of Figure 2 is the same as the seat 11 of Figure 1 except that the outside diameter may be different, but the seal 11 of Figure 2 has a steel sleeve 13 shrunk thereon. In both embodiments of the invention the seat surface 12 is a zone of a spherical surface. In both embodiments of the invention the ball 10 is a true sphere. In both embodiments of the invention the seat 11 is shown as a hollow cylinder modified by one or a pair of spherical zone surfaces 12. It is better to provide a pair of surfaces 12 than only a single surface since thereby the seat can be turned end for end to extend its life.

A check valve made in accordance with this invention was delivered to an oil company for test more than ten months ago and I am informed this check valve was placed in an oil pump located deep in a well and is still operating successfully. It is well known that where the conditions are at all severe steel check valves usually wear out in less than a month. It is difficult to replace check valves in oil pumps deep in the ground and hence improvement in check valves to give longer life is considered vital in the oil industry.

The effect of the cobalt oxide addition is to raise the compressive strength and the effect of the magnesia, MgO addition is to inhibit crystal growth. Too much crystal growth produces flaws in the articles.

The balls 10 according to the invention are at least 96% alumina $Al_2O_3$. The specific gravity of the balls is usually from 3.94 to 3.98 and should be at least 3.90. The generally accepted specific gravity of pure massive alumina is 4.00. Thus it will be seen that the balls 10 are extremely dense. However the specific gravity of the balls is low as compared with balls usually used which are made of steel. The specific gravity of steel is about 7.85. Thus a ball of a given size made according to this invention will weigh not much more than half that of a steel ball of the same size. This greatly reduces the force of impacts upon the seat. By reason of the inhibition of crystal growth the alumina balls according to this invention have a fine crystalline structure.

Check valves according to the invention are, when the embodiment of Figure 1 is used, practically immune to the effects of acids and bases, and capable of withstanding intense heat. In both embodiments the check valves are highly resistant to abrasion and by reason of the lightness of the ball to disintegration from repeated shock. Thus these check valves can be used in high speed pumps and also where the liquid being pumped contains a large percentage of sand or other abrasive substance. Preferably the steel sleeve 13, when it is used at all, should be made of stainless steel, such as the well known 18–8 type, which itself is fairly resistant to corrosion.

It will thus be seen that there has been provided by this invention a check valve in which the various objects hereinabove set forth together with many thoroughly practical advantages are successfully achieved. As many possible embodiments may be made of the above invention and as many changes might be made in the embodiments above set forth, it is to be understood that all matter hereinbefore set forth or shown in the accompanying drawings is to be interpreted as illustrative and not in a limiting sense.

I claim:

1. A check valve consisting of an alumina ball and a seat made of 90% by volume boride selected from the group consisting of $CB_4$, $TiB_2$, $VB_2$, $CrB_2$, $ZrB_2$, $CbB_2$, $Mo_2B_5$, $HfB_2$, $TaB_2$ and $W_2B_5$, and mixtures thereof, at least 40% by volume of the composition being carbon boride $CB_4$ and not over 50% of the composition by volume being metal boride and 97% by volume of the composition being boride selected from said group and uncombined boron and carbon in solid solution.

2. A check valve consisting of a spherical ball consisting essentially of alumina and being at least 96% by weight $Al_2O_3$ and having a specific gravity of at least 3.90 and having a fine crystalline structure, and a seat made of 90% by volume boride selected from the group consisting of $CB_4$, $TiB_2$, $VB_2$, $CrB_2$, $ZrB_2$, $CbB_2$, $Mo_2B_5$, $HfB_2$, $TaB_2$ and $W_2B_5$, and mixtures thereof, at least 40% by volume of the composition being carbon boride $CB_4$ and not over 50% of the composition by volume being metal boride and 97% by volume of the composition being boride selected from said group and uncombined boron and carbon in solid solution.

3. A check valve according to claim 1 in which the seat is under compression in a steel sleeve.

4. A check valve according to claim 2 in which the seat is under compression in a steel sleeve.

5. A check valve according to claim 2 in which the spherical ball consisting essentially of alumina contains substantially 0.4% by weight of magnesia to inhibit crystal growth.

References Cited in the file of this patent

UNITED STATES PATENTS

| Number | Name | Date |
|---|---|---|
| 1,435,029 | Stewart | Nov. 7, 1922 |
| 1,617,603 | Larkin | Feb. 15, 1927 |
| 1,897,214 | Ridgway | Feb. 14, 1933 |
| 2,061,480 | Pigott | Nov. 17, 1936 |
| 2,311,228 | Heany | Feb. 16, 1943 |
| 2,530,274 | Weber | Nov. 14, 1950 |

OTHER REFERENCES

Chemical Engineers Handbook, second edition, 1941, McGraw-Hill of New York.